United States Patent
Hung et al.

(10) Patent No.: US 8,189,330 B2
(45) Date of Patent: May 29, 2012

(54) DOCKING STATION FOR CONNECTING TO A NOTEBOOK COMPUTER

(75) Inventors: Chin-Chung Hung, Taipei Hsien (TW);
Feng-Hsiung Wu, Taipei Hsien (TW);
Ming-Hsien Lin, Taipei Hsien (TW);
An-Yu Hsieh, Taipei Hsien (TW);
Tsung-Hsien Chen, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 114 days.

(21) Appl. No.: 12/911,746

(22) Filed: Oct. 26, 2010

(65) Prior Publication Data

US 2011/0141685 A1    Jun. 16, 2011

(30) Foreign Application Priority Data

Dec. 10, 2009    (TW) ................................ 98223154 U

(51) Int. Cl.
*H05K 5/00*        (2006.01)
*H05K 7/00*        (2006.01)

(52) U.S. Cl. ............................ 361/679.43; 361/679.41

(58) Field of Classification Search ............. 361/679.41, 361/679.43
See application file for complete search history.

(56) References Cited

U.S. PATENT DOCUMENTS

| 6,560,101 | B1 * | 5/2003 | Oross et al. ............... 361/679.44 |
| 6,741,462 | B2 * | 5/2004 | Kamphuis et al. ........ 361/679.02 |
| 7,633,750 | B2 * | 12/2009 | Fan et al. .................. 361/679.43 |
| 2007/0070598 | A1 * | 3/2007 | Chuang .......................... 361/686 |
| 2010/0067189 | A1 * | 3/2010 | Hung ....................... 361/679.41 |

* cited by examiner

*Primary Examiner* — Anthony Haughton
(74) *Attorney, Agent, or Firm* — Winston Hsu; Scott Margo

(57) ABSTRACT

A docking station for connecting a notebook computer includes a supporting frame, a connector for electrically connecting to the notebook computer, and a handle pivoted to the supporting frame. A first slot is formed on the handle, and the handle includes a pushing part for pushing the connector in a first direction. The docking station includes a first stopper, and one end of the first stopper is disposed inside the first slot of the handle. The first stopper does not stop the connector when the handle is located in a first position. The pushing part pushes the connector in the first direction so that the connector is connected to the notebook computer, and the first slot drives the first stopper in a second direction so that the first stopper stops a side of the connector when the handle rotates from a first position to a second position.

17 Claims, 9 Drawing Sheets

DOCKING STATION FOR CONNECTING TO A NOTEBOOK COMPUTER

BACKGROUND OF THE INVENTION

1. Field of the Invention

The present invention relates to a docking station for docking with a notebook computer, and more particularly, to a docking station for conveniently docking with a notebook computer in a detachable manner.

2. Description of the Prior Art

For expanding functions of a notebook computer in the market, a conventional docking station for docking with the notebook computer is available to provide various interfaces to connect to peripheral devices so as to expand the functions of the notebook computer. The notebook computer can apply the peripheral devices as a desktop computer when connecting to the docking station, and the notebook computer can be a portable device when separating from the docking station. Due to a weight of the notebook computer and strength demand between the notebook computer and the docking station, many kinds of fixing mechanisms disposed on the docking station are utilized for connecting to or disconnecting from the notebook computer. When the fixing mechanisms are unbalancedly forced, it is difficult to separate the docking station from the notebook computer. In addition, the above-mentioned fixing mechanisms are complicated and lack for fool-proof design, so that data and hardware are destroyed easily when the notebook computer and the docking station are separated accidentally. Thus, design of a docking station for the notebook computer with simple structure and fool-proof protection is an important issue in the mechanism design of the notebook computer industry.

SUMMARY OF THE INVENTION

The present invention provides a docking station for docking with a notebook computer conveniently for solving above drawbacks.

According to the claimed invention, a docking station includes a supporting frame, a connector installed on the supporting frame in a movable manner for electrically connecting to a notebook computer, a handle pivoted to the supporting frame, a first slot being formed on the handle, and the handle comprising a pushing part for pushing the connector in a first direction, and a first stopper, an end of the first stopper being disposed inside the first slot of the handle. The first stopper does not stop the connector when the handle is located in a first position, and the pushing part pushes the connector in the first direction so that the connector is electrically connected to the notebook computer, and the first slot drives the first stopper to move in a second direction different from the first direction so that the first stopper stops a side of the connector when the handle rotates from the first position to a second position.

According to the claimed invention, the supporting frame includes a wedging base, and the other end of the first stopper is disposed inside the wedging base in a movable manner.

According to the claimed invention, a first protrusion is installed on the end of the first stopper and disposed inside the first slot of the handle in a movable manner.

According to the claimed invention, a second slot is formed on the handle, and a second protrusion is installed on the supporting frame and disposed inside the second slot of the handle in a movable manner.

According to the claimed invention, the docking station further includes a recovering component connected to the handle for driving the handle to rotate from the second position to the first position.

According to the claimed invention, the first slot does not move the first stopper so that the first stopper stops the side of the connecter when the recovering component drives the handle to rotate from the second position to the first position.

According to the claimed invention, the docking station further includes a link connected to the handle and the connector. The first slot drives the first stopper to move in a direction opposite to the second direction so that the first stopper separates from the side of the connector, and the link is for driving the connector to move in a direction opposite to the first direction so that the connector separates from the notebook computer when the handle rotates from the first position to a third position.

According to the claimed invention, a third slot is formed on the link, a third protrusion is installed on the connector and disposed inside the third slot of the link in a movable manner, and the link drives the connector to move in the direction opposite to the first direction after the handle rotates along a predetermined path from the first position to the third position.

According to the claimed invention, the docking station further includes a base, a linking component installed on the base in a movable manner. The pushing part pushes the linking component in the first direction when the handle rotates from the first position to the second position. The docking station further includes a second stopper connected to the first stopper for being driven to stop the linking component when the first stopper moves in the second direction, a contacting component installed on the base in a movable manner and disposed on a side of the base opposite to the supporting frame for contacting against the notebook computer in the direction opposite to the first direction, and a lever pivoted to the base. An end of the lever contacts the linking component, the other end of the lever contacts the contacting component, and the other end of the lever drives the contacting component to move in the direction opposite to the first direction so as to contact against the notebook when the linking component pushes the end of the lever in the first direction.

According to the claimed invention, the docking station further includes a first elastic component connected to the second stopper for providing an elastic force to the second stopper in the second direction.

According to the claimed invention, the docking station further includes a second elastic component connected to the linking component for providing an elastic force to the linking component in the direction opposite to the first direction.

According to the claimed invention, the other end of the lever drives the contacting component to move in the first direction so that the contacting component separates from the notebook computer when the linking component pulls the end of the lever in the direction opposite to the first direction.

According to the claimed invention, the contacting component includes a pin for inserting into the notebook computer.

According to the claimed invention, the docking station further includes a base and a first latching component installed on the base in a movable manner. The first latching component includes a first protruding portion for contacting against the contacting component so as to prevent the contacting component from moving in the direction opposite to the first direction, and a first pressing portion for being pressed by the notebook computer so as to drive the first protruding portion to separate from the contacting component.

According to the claimed invention, the docking station further includes at least one third elastic component connected to the first latching component for providing an elastic force to first latching component in a direction opposite to a pressing direction of the notebook computer.

According to the claimed invention, the docking station further includes a base and a second latching component installed on the base in a movable manner. The second latching component includes a second protruding portion for inserting into a hole on the handle so as to fix the handle, and a second pressing portion for being pressed by the notebook computer so as to drive the second protruding portion to separate from the hole on the handle.

According to the claimed invention, the docking station further includes at least one fourth elastic component connected to the second latching component for providing an elastic force to the second latching component in a direction opposite to a pressing direction of the notebook computer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
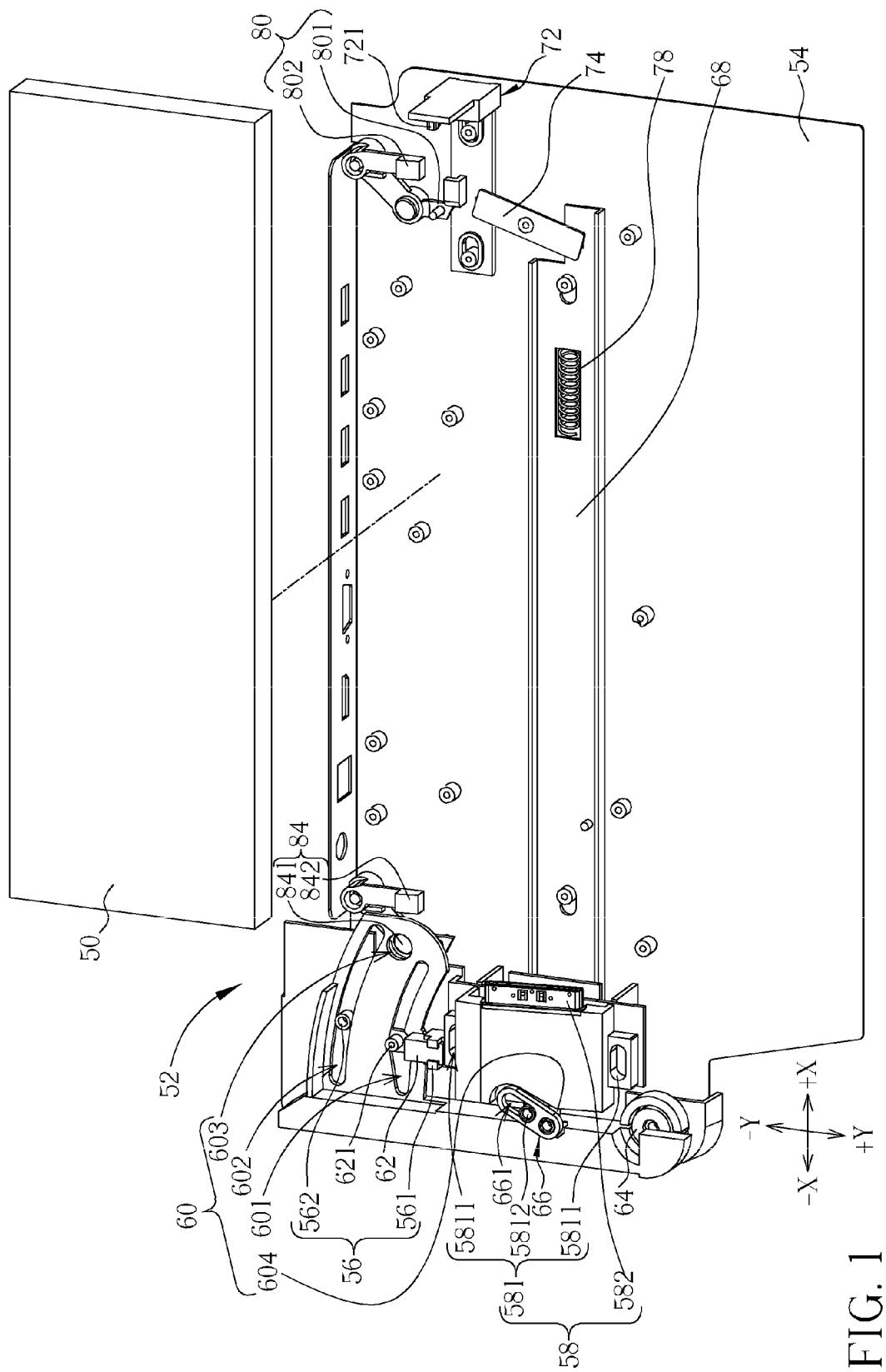
FIG. 1 is an internal view of a docking station for docking with a notebook computer according to a preferred embodiment of the present invention.
Figure 2:
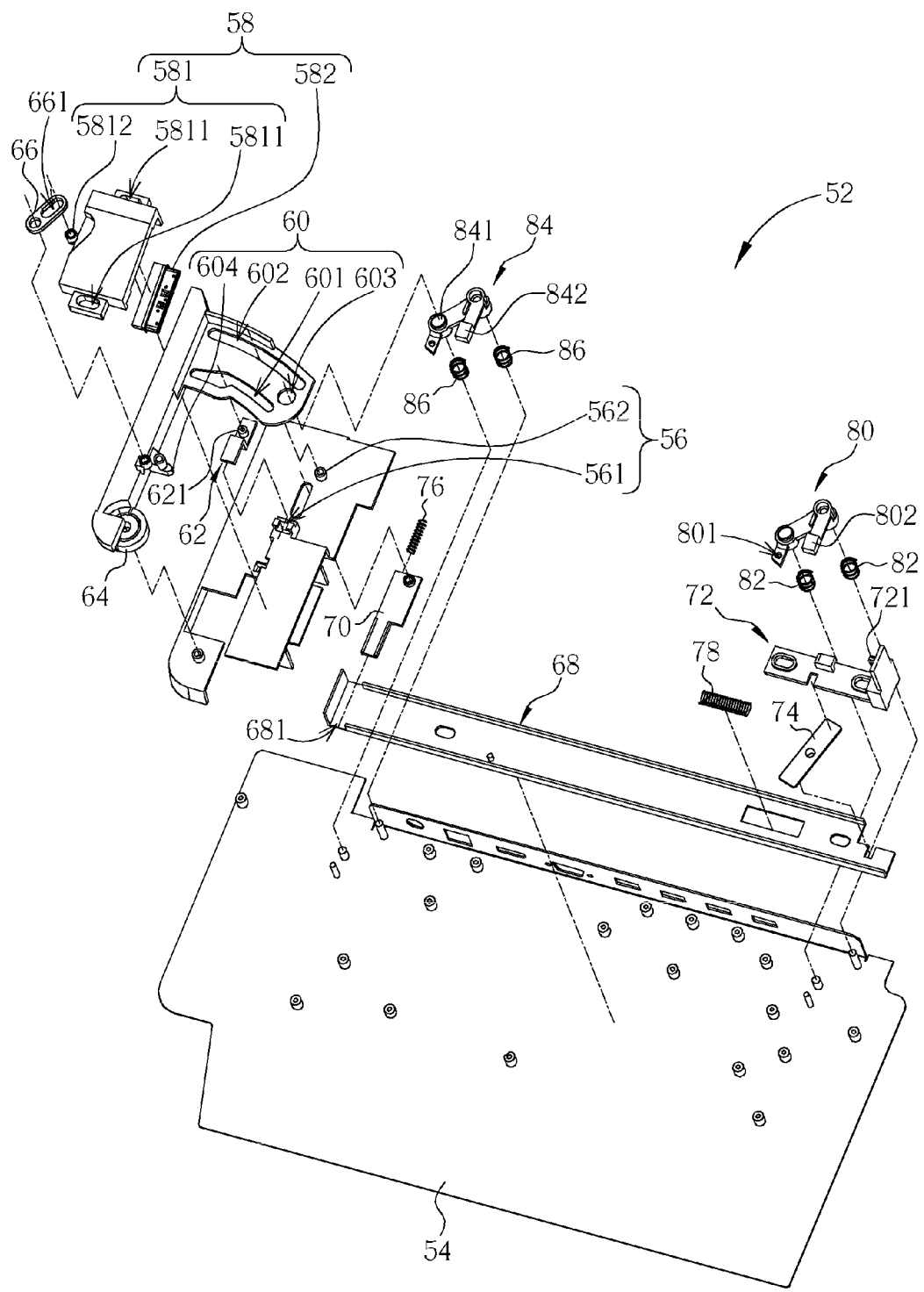
FIG. 2 is an exploded diagram of the docking station according to the preferred embodiment of the present invention.

Please refer to FIG. 1 and FIG. 2. FIG. 1 is an internal view of a docking station 52 for docking with a notebook computer 50 according to a preferred embodiment of the present invention. FIG. 2 is an exploded diagram of the docking station 52 according to the preferred embodiment of the present invention. The docking station 52 can provide various interfaces for the notebook computer 50 so as to connect to peripheral devices for expanding functions of the notebook computer 50. The docking station 52 includes a base 54 for supporting internal components. The docking station 52 further includes a supporting frame 56 installed on the base 54, and the supporting frame 56 includes a wedging base 561 and a second protrusion 562. The docking station 52 further includes a connector 58 installed on the supporting frame 56 in a movable manner. For example, two grooves 5811 can be formed on two sides of a cover 581 of the connector 58, and pins or other fixing components can be formed on the supporting frame 56 corresponding to the grooves 5811 of the connector 58 for fixing the connector 58 on the supporting frame 56, so that the grooves 5811 of the connector 58 can slide relative to the supporting frame 56. In addition, a third protrusion 5812 can be disposed on an end of the cover 581. A joint 582 of the connector 58 can be for electrically connecting to the notebook computer 50 so as to provide a transmission interface between the docking station 52 and the notebook computer 50. The docking station 52 further includes a handle 60 pivoted to the supporting frame 56. A first slot 601, a second slot 602, and a hole 603 are formed on the handle 60. The first slot 601 can be composed of arc slots with different curvatures, and the second slot 602 can be the arc slot with uniform curvature. In addition, the handle 60 includes a pushing part 604 for pushing the connector 58 in +X direction (a first direction).

The docking station 52 further includes a first stopper 62. An end of the first stopper 62 is disposed inside the first slot 601 of the handle 60. For example, a first protrusion 621 can be installed on the end of the first stopper 62 and disposed inside the first slot 601 of the handle 60 in a movable manner, and the second protrusion 562 of the supporting frame 56 can be disposed inside the second slot 602 of the handle 60 in a movable manner, so that the handle 60 can rotate relative to the supporting frame 56 and the first stopper 62 smoothly. The other end of the first stopper 62 can be disposed inside the wedging base 561 of the supporting frame 56 for moving in ±Y direction so as to stop the connector 58. In addition, a height difference can be formed between two ends of the first stopper 62, that is, the first stopper 62 can be a Z-shaped structure. The docking station 52 further includes a recovering component 64 connected to the handle 60 for driving the handle 60 to recover to an initial position. The recovering component 64 can be a torsional spring. The docking station 52 further includes a link 66 connected to the handle 60 and the connector 58. A third slot 661 is formed on the link 66, and the third protrusion 5812 of the connector 58 can be disposed inside the third slot 661 of the link 66 in a movable manner.

The docking station 52 further includes a linking component 68 installed on the base 54 in a movable manner. A breach 681 is formed on a side of the linking component 68. The linking component 68 can be a strip-shaped flat structure. The docking station 52 further includes a second stopper 70 connected to the first stopper 62 and installed inside the breach 681 of the linking component 68 for being driven to stop the linking component 68 when the first stopper 62 moves in −Y direction (a second direction). The docking station 52 further includes a contacting component 72 installed on the base 54 and disposed on a side of the supporting frame 56 in a movable manner for contacting against the notebook computer 50 in −X direction (a direction opposite to the first direction), so as to clap the notebook computer 50 with the connector 58 in X direction. A pin 721 can be disposed on the contacting component 72 for inserting into the notebook computer 50. The docking station 52 further includes a lever 74 pivoted to the base 54. An end of the lever 74 contacts the linking component 68, and the other end of the lever 74 contacts the contacting component 72. When the linking component 68 pushes the end of the lever 74 in +X direction (the first direction), the other end of the lever 74 drives the contacting component 72 to move in −X direction (the direction opposite to the first direction), so that the contacting component 72 contacts against the notebook computer 50. On the other hand, when the linking component 68 pulls the end of the lever 74 in −X direction (the direction opposite to the first direction), the other end of the lever 74 drives the contacting component 72 to move in +X direction (the first direction), so that the contacting component 72 separates from the notebook computer 50. The docking station 52 further includes a first elastic component 76 connected to the second stopper 70 for providing an elastic force to the second stopper 70 in −Y direction (the second direction), so as to provide a pre-force to the second stopper 70 to stop the linking component 68. The first elastic component 76 can be a spring. The docking station 52 further includes a second elastic component 78 connected to the linking component 68 for providing an elastic force to the linking component 68 in −X direction (the direction opposite to the first direction).

The docking station 52 further includes a first latching component 80 installed on the base 54 in a movable manner. The first latching component 80 includes a first protruding portion 801 for contacting against the contacting component 72, so as to prevent the contacting component 72 from moving in −X direction (the direction opposite to the first direction). The first latching component 80 further includes a first pressing portion 802 for being pressed by the notebook computer 50, so as to drive the first protruding portion 801 to separate from the contacting component 72. That is to say, when the docking station 52 is connected to the notebook computer 50 and the first pressing portion 802 of the first latching component 80 is pressed, the first protruding portion 801 of the first latching component 80 separates from the contacting component 72. Meanwhile, the contacting component 72 moves in −X direction and contacts against the notebook computer 50. When the docking station 52 separates from the notebook computer 50 without pressing the first pressing portion 802 of the first latching component 80, the first protruding portion 801 of the first latching component 80 contacts against the contacting component 72. Meanwhile, the contacting component 72 can not move in −X direction and does not contact against the notebook computer 50, and a user can lift the notebook computer 50 up for separating the docking station 52 from the notebook computer 50. The docking station 52 further includes at least one third elastic component 82 connected to the first latching component 80 for providing an elastic force opposite to a pressing direction of the notebook computer 50 to the first latching component 80, so that the first protruding portion 801 of the first latching component 80 can recover to contact against the contacting component 72 when the docking station 52 separates from the notebook computer 50. The third elastic component 82 can be a spring.

In addition, the docking station 52 further includes a second latching component 84 installed on the base 54 in a movable manner. The second latching component 84 includes a second protruding portion 841 for inserting into the hole 603 on the handle 60 so as to constrain rotation of the handle 60. The second latching component 84 further includes a second pressing portion 842 for being pressed by the notebook computer 50, so as to drive the second protruding portion 841 to separate from the hole 603 on the handle 60. That is to say, when the docking station 52 is connected to the notebook computer 50 and the second pressing portion 842 of the second latching component 84 is pressed, the second protruding portion 841 of the second latching component 84 separates from the hole 603 on the handle 60. Meanwhile, the handle 60 can be rotated freely. When the docking station 52 separates from the notebook computer 50 without pressing the second pressing portion 842 of the second latching component 84, the second protruding portion 841 of the second latching component 84 inserts into the hole 603 on the handle 60, so as to fix the handle 60 for preventing the handle 60 from shifting when the docking station 52 is vibrated, or for preventing the connector 58 from being damaged by the notebook computer 50 when the handle 60 shifts and then the notebook computer 50 is docked on the docking station 52. The docking station 52 further includes at least one fourth elastic component 86 connected to the second latching component 84 for providing an elastic force opposite to the pressing direction of the notebook computer 50 to the second latching component 84, so that when the notebook computer 50 separates from the docking station 52, the second protruding portion 841 of the second latching component 84 recovers to insert into the hole 603 on the handle 60, so as to constrain rotation of the handle 60. The fourth elastic component 86 can be a spring.

Figure 3:
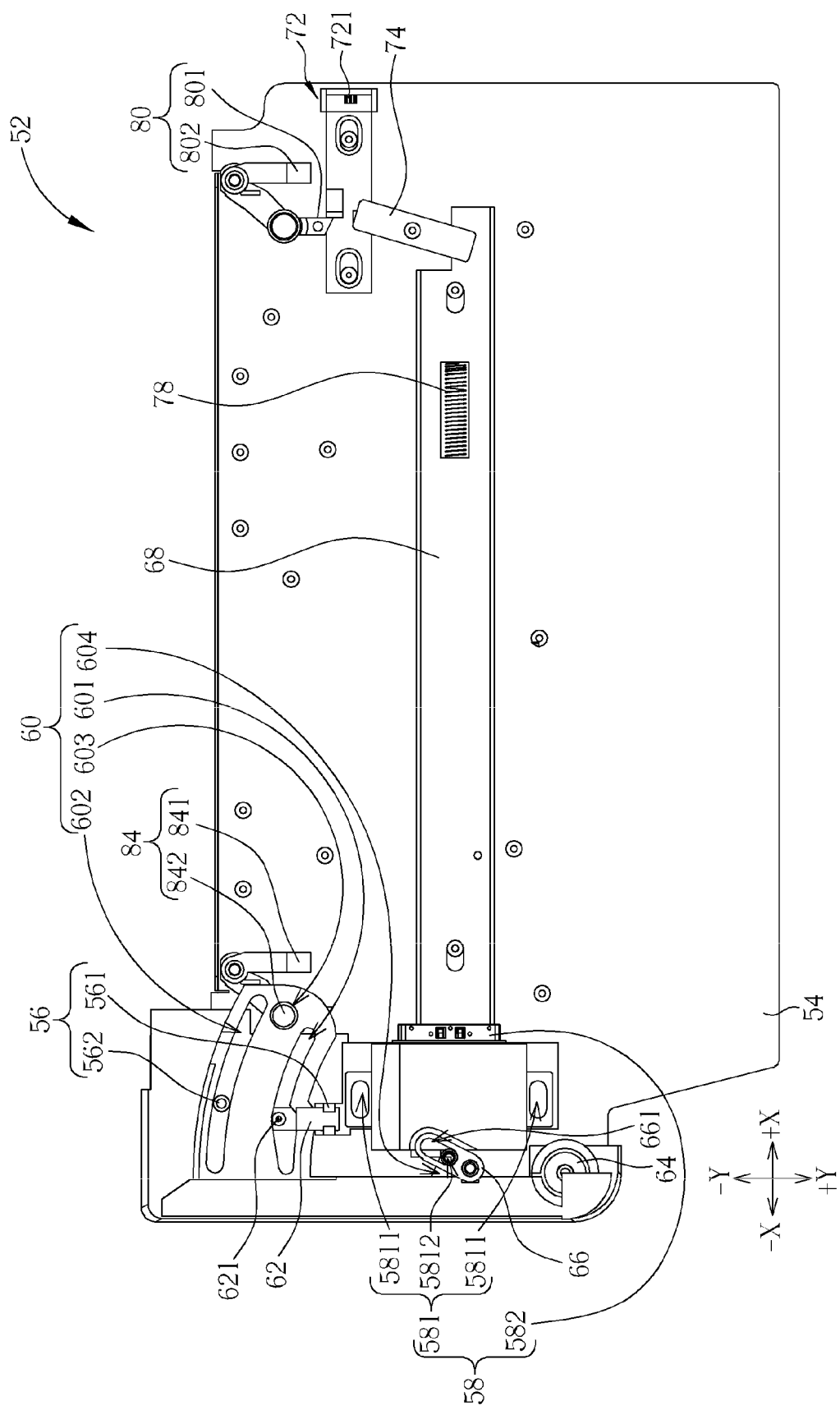
FIG. 3 to FIG. 6 are diagrams of the docking station in different statuses according to the preferred embodiment of the present invention.

Please refer to FIG. 3 to FIG. 6. FIG. 3 to FIG. 6 are diagrams of the docking station 52 in different statuses according to the preferred embodiment of the present invention. As shown in FIG. 3, when the handle 60 of the docking station 52 is located at a first position, the first stopper 62 does not stop the connector 58, and the connector 58 is not located at a position for connecting to the notebook computer 50. When the user pushes the handle 60 to rotate from the first position shown in FIG. 3 to a second position shown in FIG. 4, an upper part of the pushing part 604 of the handle 60 pushes the connector 58 to move in +X direction (the first direction), so that the connector 58 is electrically connected to the notebook computer 50 as shown in FIG. 1. Because the first slot 601 is composed of the arc slots with different curvatures, the first slot 601 of the handle 60 can drive the first stopper 62 to move in +Y direction (the second direction) so that the first stopper 62 stops a side of the connector 58, and the connector 58 does not separate from the notebook computer 50. Meanwhile, the first stopper 62 moving in −Y direction drives the second stopper 70 to move in −Y direction. A low part of the pushing part 604 of the handle 60 pushes the linking component 68 to move in +X direction (the first direction) until the second stopper 70 stops an end of the linking component 68. When the linking component 68 pushes the end of the lever 74 in +X direction, the other end of the lever 74 drives the contacting component 72 to move in −X direction (the direction opposite to the first direction), so that the contacting component 72 contacts against the notebook computer 50, and the pin 721 of the contacting component 72 inserts into the notebook computer 50. Therefore, the connector 58 and the contacting component 72 can combine the docking station 52 with the notebook computer 50 in ±X direction stably.

Figure 4:
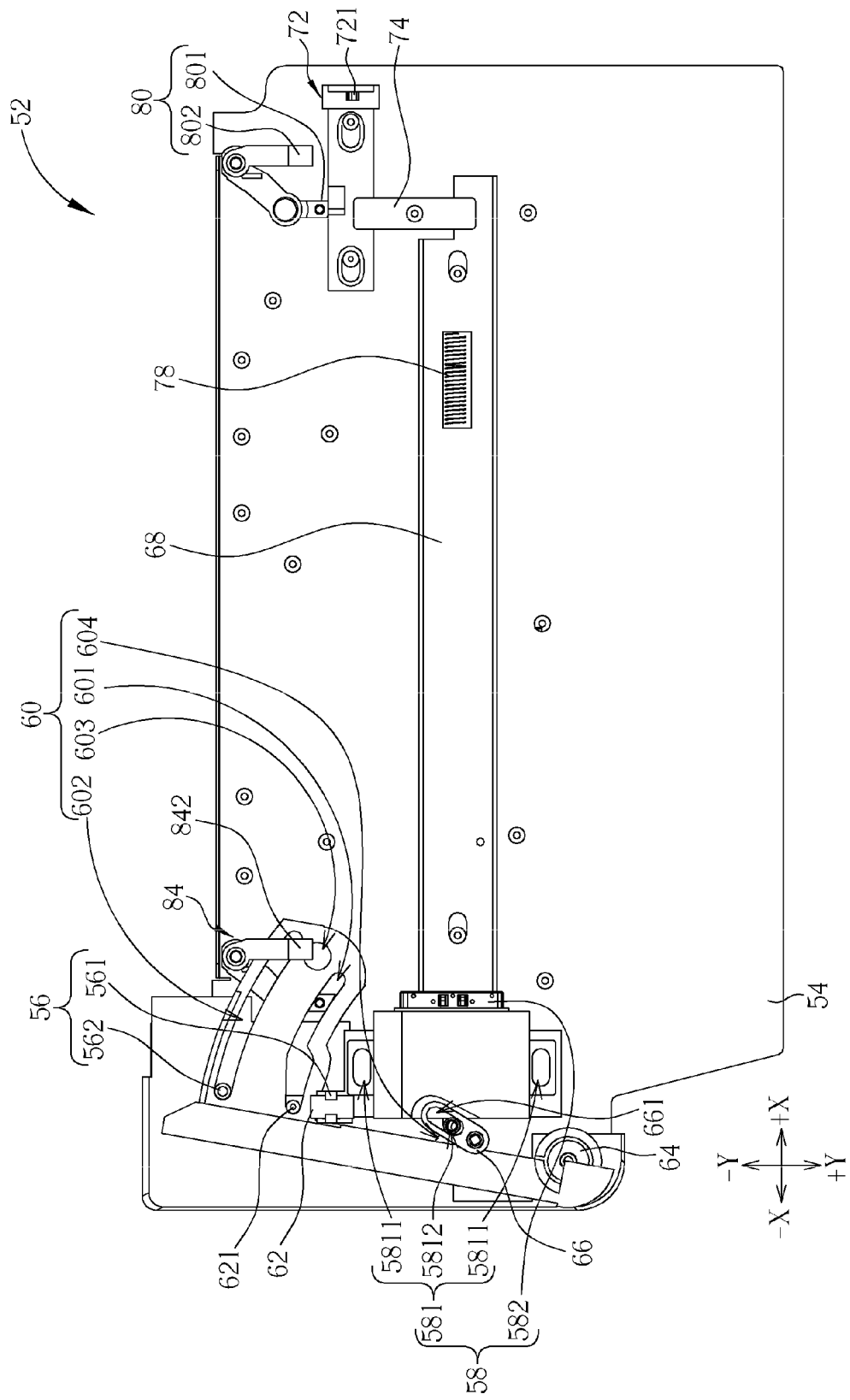
Figure 5:
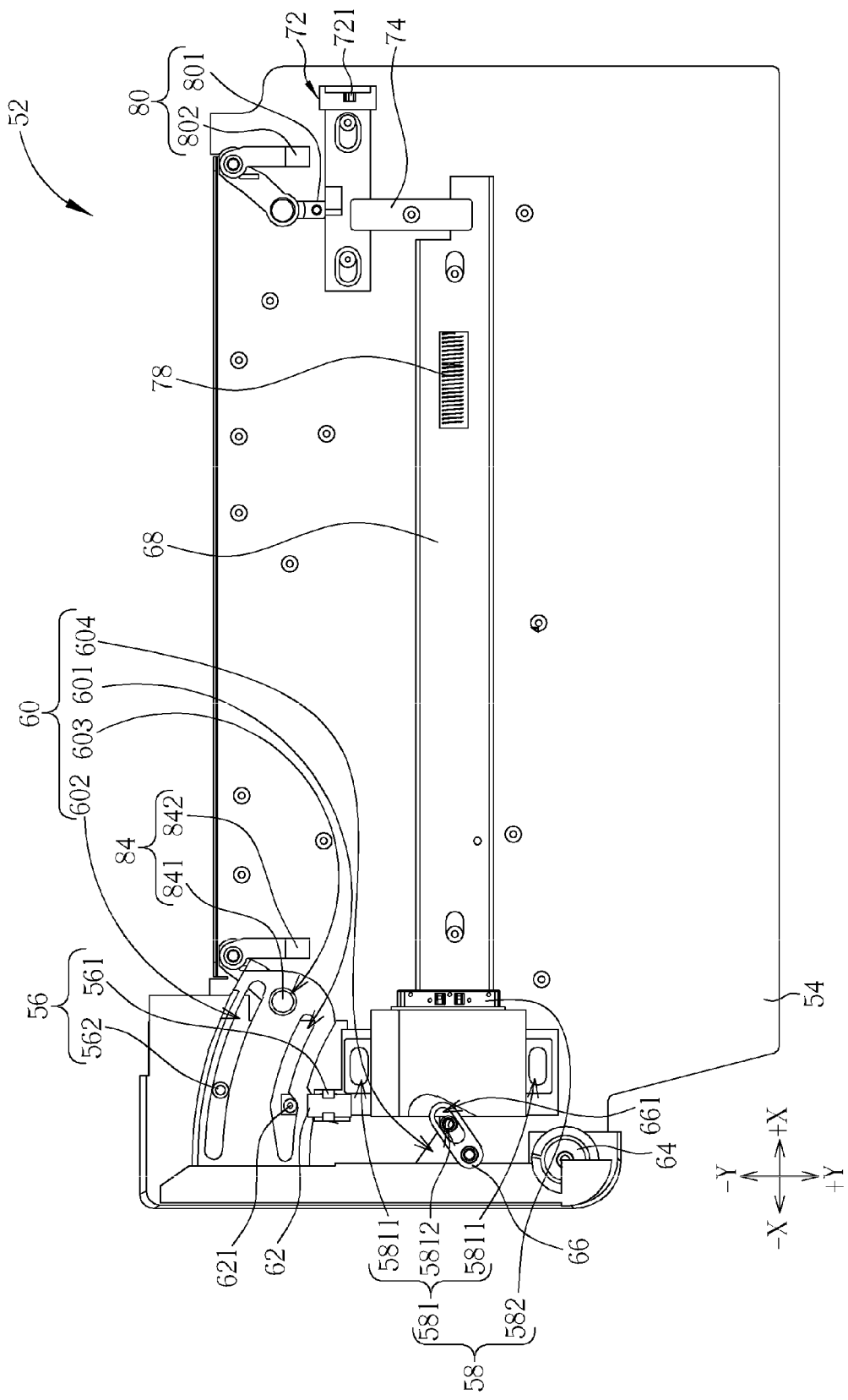

When the user releases the handle 60 at the second position shown in FIG. 4, the recovering component 64 connected to the handle 60 can drive the handle 60 to rotate from the second position as shown in FIG. 4 to the first position as shown in FIG. 5. It should be mentioned that difference between FIG. 5 and FIG. 3 is the position of the first stopper 62. When the recovering component 64 drives the handle 60 to recover from the second position as shown in FIG. 4 to the first position as shown in FIG. 5, the first slot 601 of the handle 60 does not drive the first stopper 62 to move in −Y direction, so that the first stopper 62 can continuously stop the side of the connector 58, and the connector 58 does not separate from the notebook computer 50. Because the first stopper 62 does not move at the same time, the second stopper 70, the linking component 68, the lever 74, and the contacting component 72 are hold at the same position as shown in FIG. 3. That is to say, the contacting component 72 continuously contacts against the notebook computer 50, and the pin 721 of the contacting component 72 keeps inserting into the notebook computer 50. Therefore, the connector 58 and the contacting component 72 still can combine the docking station 52 with the notebook computer 50 in ±X direction stably.

Figure 6:
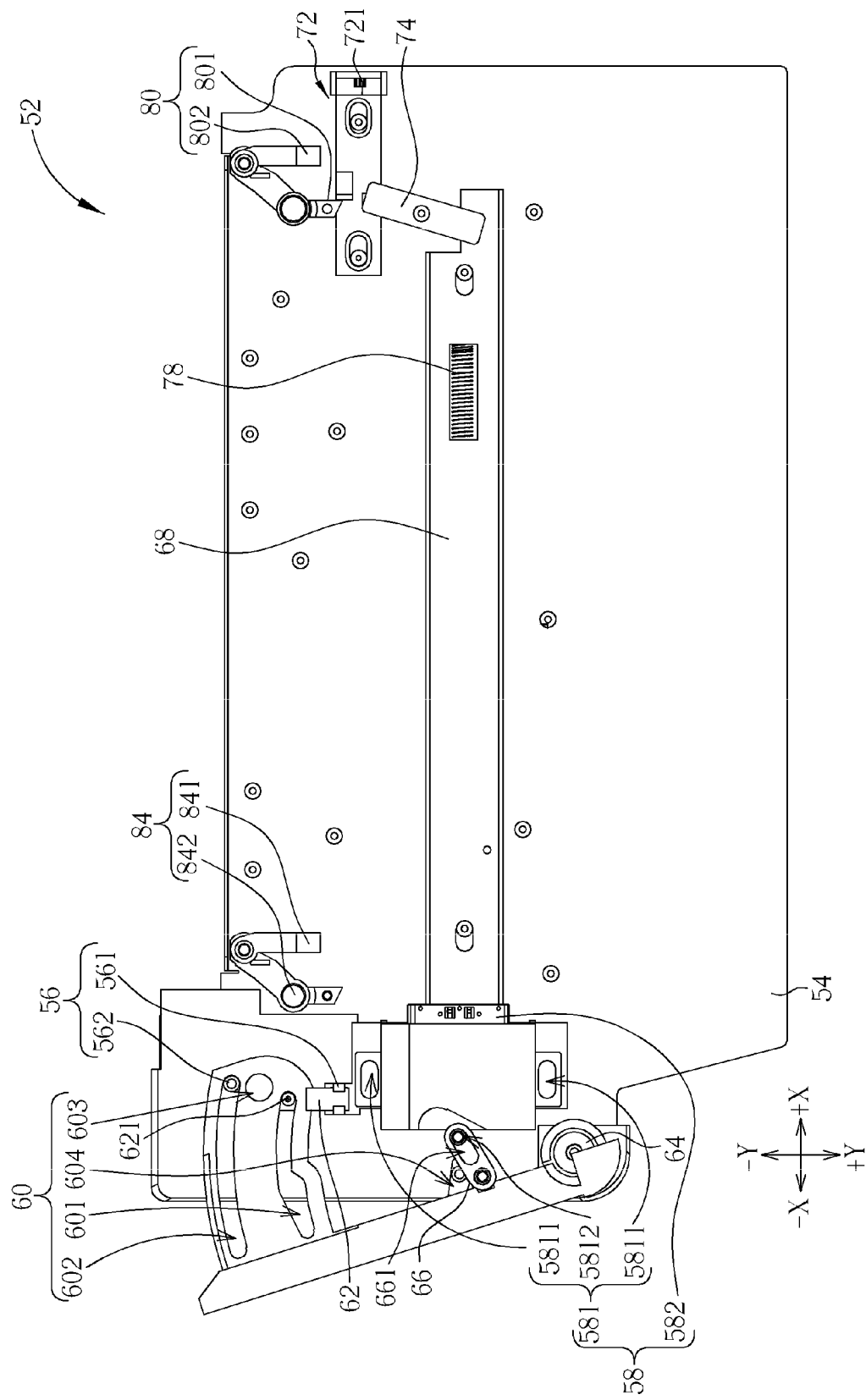

When the user pulls the handle 60 to rotate from the first position as shown in FIG. 5 to a third position as shown in FIG. 6, the first slot 601 of the handle 60 can drive the first stopper 62 to move in −Y direction, so that the first stopper 62 separates from the side of the connector 58. At the same time, the link 66 can drive the linking component 68 to move in −X direction, so that the linking component 68 separates from the notebook computer 50. It should be mentioned that a path of the third protrusion 5812 of the third slot 661 can delay movement of the linking component 68 in −X direction because the third protrusion 5812 of the connector 58 is disposed inside the third slot 661 of the link 66 in a movable manner. That is to say, after the handle 60 rotates at a predetermined stroke from the first position to the third position, the third protrusion 5812 moves to an end of the third slot 661, and then the link 66 drives the connector 58 to move in −X direction. The delay path can let the user operate the handle 60 for moving the link outward easily after the user pulls a part of the handle 60. In addition, the delay path can prevent the user from operating the handle 60 accidentally, which means the delay path provides a space for ensuring whether the user disassembles the connector 58. Furthermore, the delay path can ensure the first stopper 62 drives the connector 68 to move in −X direction after the first stopper 62 moves at a distance in −Y direction for separating from the side of the connector 58, so as to prevent the first stopper 62 from hitting the connector 58 due to an unreleased status of the linking component 68. Meanwhile, because the first stopper 62 drives the second stopper 70 to move in −Y direction, the second stopper 70 does not stop the linking component 68. The second elastic component 78 provides the recovering force in −X direction to the linking component 68, so that the linking component 68 moves in −X direction. When the linking component 68 pulls the end of the link 66 in −X direction, the other end of the link 66 drives the contacting component 72 to move in +X direction, so that the contacting component 72 separates from the notebook computer 50 and the pin 721 of the contacting component 72 removes from the notebook computer 50. At this time, the connector 58 and the contacting component 72 can not combine the docking station 52 with the notebook computer 50 in X direction, and the user can remove the notebook computer 50 from the docking station 52. After, the user can release the handle 60, and the recovering component 64 of the handle 60 can drive the handle 60 to recover form the third position as shown in FIG. 6 to the first position as shown in FIG. 3.

Figure 7:
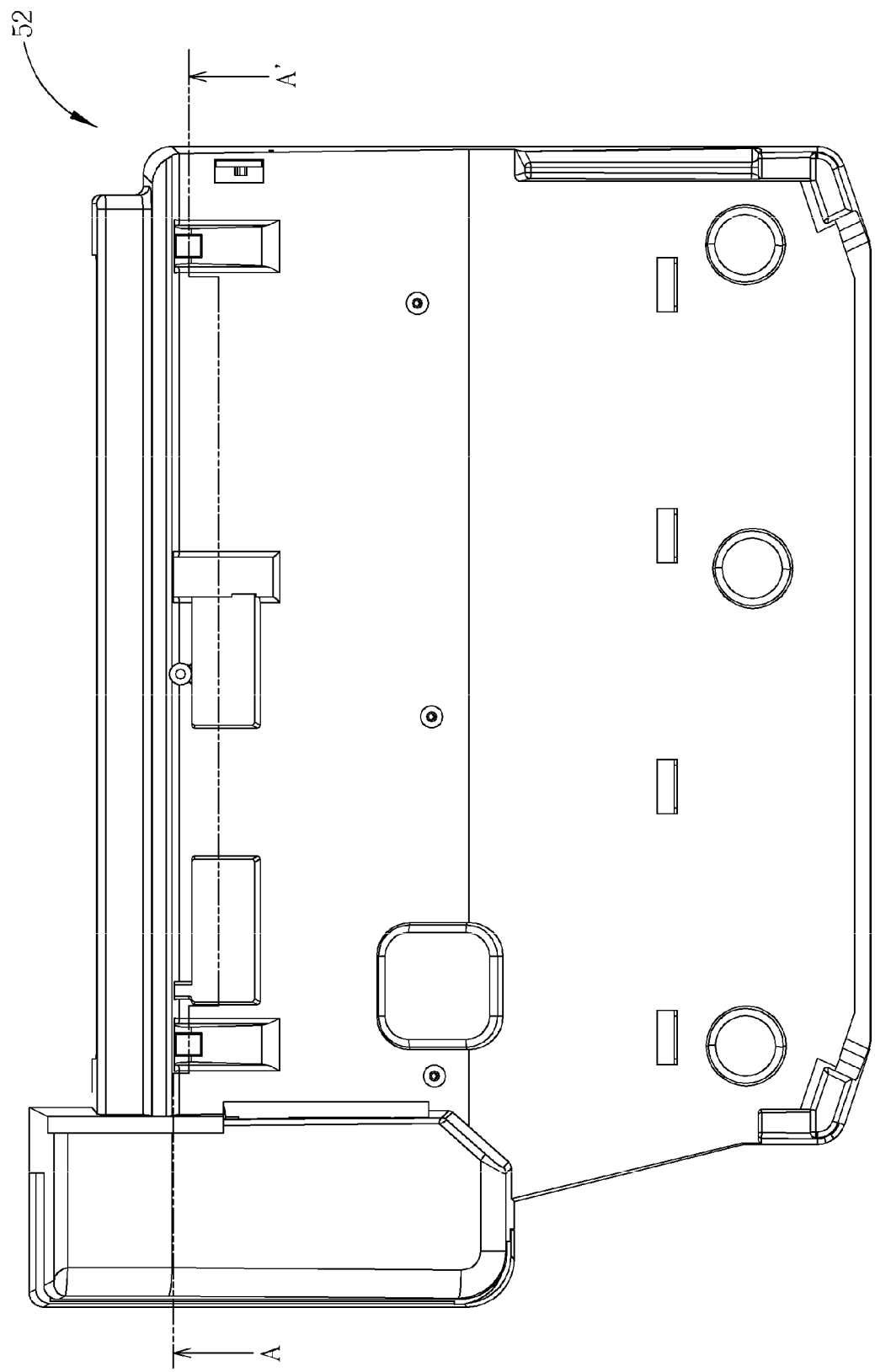
FIG. 7 is a perspective drawing of the docking station according to the preferred embodiment of the present invention.
Figure 8:
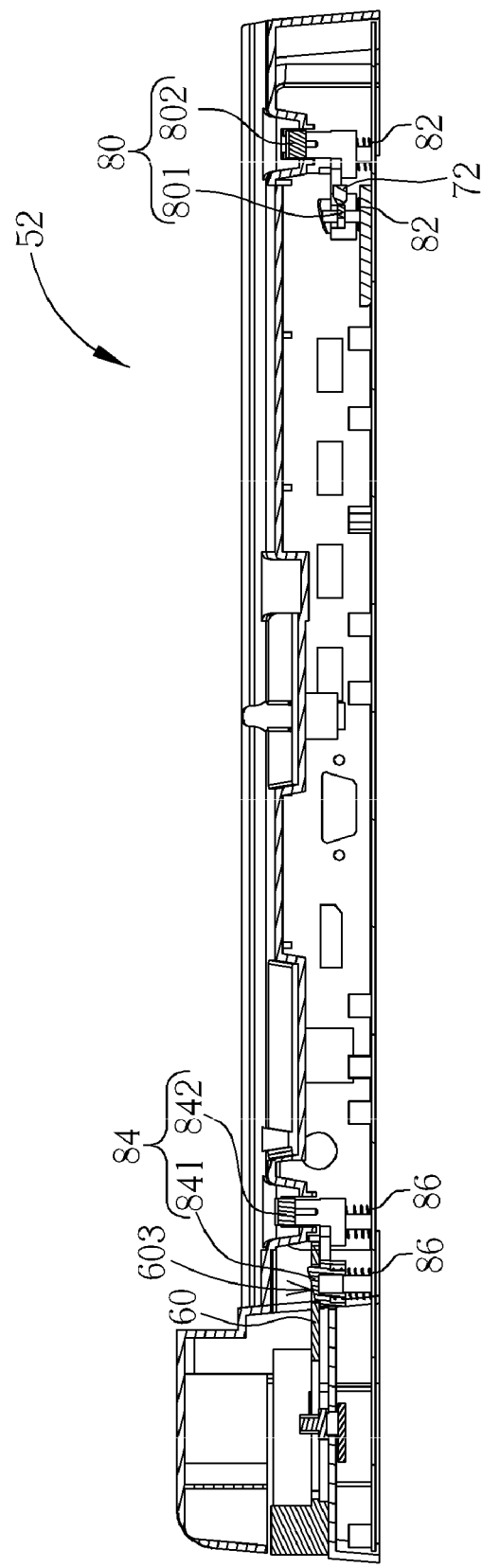
FIG. 8 and FIG. 9 are sectional views of the docking station in different statuses along the line A-A' shown in FIG. 7 according to the preferred embodiment of the present invention.
Figure 9:
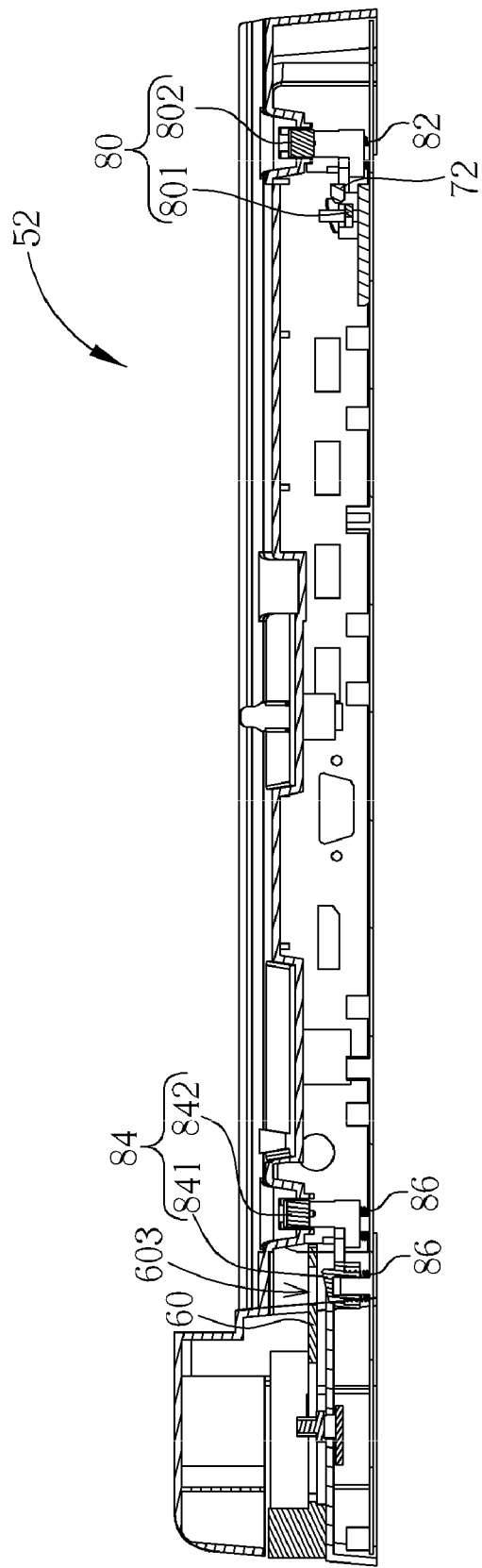

Please refer to FIG. 7 to FIG. 9. FIG. 7 is a perspective drawing of the docking station 52 according to the preferred embodiment of the present invention. FIG. 8 and FIG. 9 are sectional views of the docking station 52 in different statuses along line A-A' as shown in FIG. 7 according to the preferred embodiment of the present invention. As shown in FIG. 8, when the notebook computer 50 is not installed on the docking station 52, the notebook computer 50 does not press the first pressing portion 801 of the first latching component 80 and the second pressing portion 842 of the second latching component 84. At this time, the first protruding portion 801 of the first latching component 80 contacts against the contacting component 72, the contacting component 72 can not move in −X direction and can not contact against the notebook computer 50, and the second protruding portion 841 of the second latching component 84 inserts into the hole 603 on the handle 60 so as to stop rotation of the handle 60 for preventing the handle 60 from shifting when the docking station 52 is vibrated, and for preventing the connector 58 from being damaged as the handle 60 moves inward and then the notebook computer 50 is set onto the docking station 52.

When the notebook computer 50 is connected to the docking station 52, and the first pressing portion 802 of the first latching component 80 and the second pressing portion 842 of the second latching component 84 are pressed, the first protruding portion 801 of the first latching component 80 separates from the contacting component 72. Meanwhile, the contacting component 72 can move in −X direction and contact against the notebook computer 50, and the second protruding portion 841 of the second latching component 84 can separate from the hole 603 on the handle 60, so that the handle 60 can be operated as the above-mentioned working mechanism. Due to protection of the first latching component 80 and the second latching component 84, the present invention can prevent the docking station 52 from being damaged accidentally, such as vibration and an inaccurate motion.

Comparing to the prior art, the present invention provides the fixing structure with simple assembly and safety protection for docking the notebook computer on the docking station, so as to simplify operational procedure. Because structure of the handle is simple and can be manufactured easily, cost of the fixing mechanism of the present invention can be decreased effectively. In addition, a precautionary mechanism of the latching component can prevent data transmission and hardware from being damaged as the notebook computer is separated from the docking station accidentally, so that the prevent invention not only has the simply assembly for economizing the cost, but also has the protection mechanism for preventing the data transmission and the hardware from being damaged.

Those skilled in the art will readily observe that numerous modifications and alterations of the device and method may be made while retaining the teachings of the invention.

What is claimed is:

1. A docking station comprising:
a supporting frame;
a connector installed on the supporting frame in a movable manner for electrically connecting to a notebook computer;
a handle pivoted to the supporting frame, a first slot being formed on the handle, and the handle comprising a pushing part for pushing the connector in a first direction; and
a first stopper, an end of the first stopper being disposed inside the first slot of the handle;
wherein the first stopper does not stop the connector when the handle is located in a first position, and the pushing part pushes the connector in the first direction so that the connector is electrically connected to the notebook computer, and the first slot drives the first stopper to move in a second direction different from the first direction so that the first stopper stops a side of the connector when the handle rotates from the first position to a second position.

2. The docking station of claim 1, wherein the supporting frame comprises a wedging base, and the other end of the first stopper is disposed inside the wedging base in a movable manner.

3. The docking station of claim 1, wherein a first protrusion is installed on the end of the first stopper and disposed inside the first slot of the handle in a movable manner.

4. The docking station of claim 1, wherein a second slot is formed on the handle, and a second protrusion is installed on the supporting frame and disposed inside the second slot of the handle in a movable manner.

5. The docking station of claim 1 further comprising:
a recovering component connected to the handle for driving the handle to rotate from the second position to the first position.

6. The docking station of claim 5, wherein the first slot does not move the first stopper so that the first stopper stops the side of the connecter when the recovering component drives the handle to rotate from the second position to the first position.

7. The docking station of claim 1 further comprising:
a link connected to the handle and the connector, the first slot driving the first stopper to move in a direction opposite to the second direction so that the first stopper separates from the side of the connector, and the link being for driving the connector to move in a direction opposite to the first direction so that the connector separates from the notebook computer when the handle rotates from the first position to a third position.

8. The docking station of claim 7, wherein a third slot is formed on the link, a third protrusion is installed on the connector and disposed inside the third slot of the link in a movable manner, and the link drives the connector to move in the direction opposite to the first direction after the handle rotates along a predetermined path from the first position to the third position.

9. The docking station of claim 1 further comprising:
a base;
a linking component installed on the base in a movable manner, the pushing part pushing the linking component in the first direction when the handle rotates from the first position to the second position;
a second stopper connected to the first stopper for being driven to stop the linking component when the first stopper moves in the second direction;
a contacting component installed on the base in a movable manner and disposed on a side of the base opposite to the supporting frame for contacting against the notebook computer in the direction opposite to the first direction; and
a lever pivoted to the base, an end of the lever contacting the linking component, the other end of the lever contacting the contacting component, and the other end of the lever driving the contacting component to move in the direction opposite to the first direction so as to contact against the notebook computer when the linking component pushes the end of the lever in the first direction.

10. The docking station of claim 9 further comprising:
a first elastic component connected to the second stopper for providing an elastic force to the second stopper in the second direction.

11. The docking station of claim 9 further comprising:
a second elastic component connected to the linking component for providing an elastic force to the linking component in the direction opposite to the first direction.

12. The docking station of claim 9, wherein the other end of the lever drives the contacting component to move in the first direction so that the contacting component separates from the notebook computer when the linking component pulls the end of the lever in the direction opposite to the first direction.

13. The docking station of claim 9, wherein the contacting component comprises a pin for inserting into the notebook computer.

14. The docking station of claim 1 further comprising:
a base; and
a first latching component installed on the base in a movable manner, the first latching component comprising:
a first protruding portion for contacting against the contacting component so as to prevent the contacting component from moving in the direction opposite to the first direction; and
a first pressing portion for being pressed by the notebook computer so as to drive the first protruding portion to separate from the contacting component.

15. The docking station of claim 14 further comprising:
at least one third elastic component connected to the first latching component for providing an elastic force to the first latching component in a direction opposite to a pressing direction of the notebook computer.

16. The docking station of claim 1 further comprising:
a base; and
a second latching component installed on the base in a movable manner, the second latching component comprising:
a second protruding portion for inserting into a hole on the handle so as to fix the handle; and
a second pressing portion for being pressed by the notebook computer so as to drive the second protruding portion to separate from the hole on the handle.

17. The docking station of claim 16 further comprising:
at least one fourth elastic component connected to the second latching component for providing an elastic force to the second latching component in a direction opposite to a pressing direction of the notebook computer.

* * * * *